US007293272B1

(12) United States Patent
Okcu et al.

(10) Patent No.: US 7,293,272 B1
(45) Date of Patent: Nov. 6, 2007

(54) DEVICE DRIVER PROCESSING FOR AUTOMATED SYSTEM RESTORES

(75) Inventors: Okan Okcu, Austin, TX (US); Nicholas R. Graf, Austin, TX (US)

(73) Assignee: Veritas Operating Corporation, Mountain View, CA (US)

( * ) Notice: Subject to any disclaimer, the term of this patent is extended or adjusted under 35 U.S.C. 154(b) by 696 days.

(21) Appl. No.: 10/788,120

(22) Filed: Feb. 26, 2004

(51) Int. Cl.
*G06F 13/10* (2006.01)
*G06F 9/06* (2006.01)
(52) U.S. Cl. ...................................... 719/327; 719/321
(58) Field of Classification Search ................ 719/321, 719/327
See application file for complete search history.

(56) References Cited

U.S. PATENT DOCUMENTS

| 5,598,563 | A | * | 1/1997 | Spies ............................ 713/2 |
| 5,708,604 | A | * | 1/1998 | Fontana et al. ......... 365/185.23 |
| 5,715,456 | A | * | 2/1998 | Bennett et al. ................. 713/2 |
| 5,732,282 | A | * | 3/1998 | Provino et al. ............. 719/324 |
| 5,802,365 | A | * | 9/1998 | Kathail et al. .............. 719/321 |
| 5,890,204 | A | | 3/1999 | Ofer et al. |

(Continued)

OTHER PUBLICATIONS

"CBMR-Dissimilar Hardware Recovery," CBMR Support, Jun. 2005, 9 pages.
U.S. Appl. No. 11/351,778, filed Feb. 10, 2006.

"Automated System Recovery with VERITAS Netbackup™," VERITAS Bare Metal Restore, White Paper, VERITAS Software Corp. 2002, pp. 1-10.

(Continued)

*Primary Examiner*—William Thomson
*Assistant Examiner*—Richard Pantoliano, Jr.
(74) *Attorney, Agent, or Firm*—Lawrence J. Merkel; Meyertons, Hood, Kivlin, Kowert & Goetzel, P.C.

(57) ABSTRACT

In one embodiment, a computer accessible medium comprises a plurality of instructions which, when executed, parse at least a section of an input file to identify: (i) one or more driver information files, if at least one driver information file is listed in the section, and (ii) one or more first device drivers, if at least one device driver is listed in the section. If at least one driver information file is listed in the section, the plurality of instructions parse each of the one or more driver information files to identify: (i) one or more second device drivers, if at least one device driver is included in the driver information file, and (ii) one or more miniport drivers, if at least one miniport driver is included in the driver information file. The plurality of instructions select a selected device driver from the first device drivers, the second device drivers, and the miniport drivers. The selected device driver is to be listed in an output file that is used in a text phase of an operating system installation on a computer system that includes the hardware device. In another embodiment, a computer accessible medium comprises a plurality of instructions which, when executed and if a computer system comprises at least one virtual hardware device, identify the virtual hardware device and a corresponding physical hardware device. The plurality of instructions also capture a device driver associated with the physical hardware device for use as the device driver in an install of an operating system on a second computer system having a same type of physical hardware device. Corresponding computer systems and methods are also described.

11 Claims, 8 Drawing Sheets

U.S. PATENT DOCUMENTS

| | | |
|---|---|---|
| 6,078,990 A | 6/2000 | Frazier |
| 6,170,055 B1* | 1/2001 | Meyer et al. ................. 713/2 |
| 6,185,686 B1* | 2/2001 | Glover ...................... 713/190 |
| 6,346,954 B1 | 2/2002 | Chu et al. |
| 6,640,291 B2 | 10/2003 | Fujibayashi et al. |
| 6,654,830 B1 | 11/2003 | Taylor et al. |
| 6,681,323 B1* | 1/2004 | Fontanesi et al. ............. 713/1 |
| 6,725,715 B2* | 4/2004 | Igarashi et al. ......... 73/204.22 |
| 6,820,035 B1 | 11/2004 | Zahavi |
| 7,107,534 B1 | 9/2006 | de Jong et al. |
| 2002/0019908 A1 | 2/2002 | Reuter et al. |
| 2003/0074527 A1 | 4/2003 | Burton et al. |
| 2003/0159070 A1* | 8/2003 | Mayer et al. ............... 713/201 |
| 2003/0195995 A1* | 10/2003 | Tabbara ..................... 709/313 |
| 2004/0091175 A1 | 5/2004 | Beyrouti |
| 2004/0111250 A1* | 6/2004 | Hensley ....................... 703/25 |

OTHER PUBLICATIONS

"Windows Architecture," Steven Roman, Chapter 9 from *Win32 API Programming with Virtual Basic*, published by O'Reilly and Associates, Inc., 2000Microsoft Corporation, 6 pages.

"Automated Deployment Services Technical Overview," Microsoft Corporation, Aug. 2003, pp. 1-25.

Office Action from U.S. Appl. No. 10/774,039, mailed Apr. 19, 2007.

* cited by examiner

DEVICE DRIVER PROCESSING FOR AUTOMATED SYSTEM RESTORES

BACKGROUND OF THE INVENTION

1. Field of the Invention

This invention is related to the field of restoring computer system data from backup and, more particularly, to providing device drivers for restoring to a system.

2. Description of the Related Art

Unattended, or automated, installs of operating systems may be used in a variety of situations. For example, various backup and restore products are used to safeguard software and data state on a computer system. When a failure occurs on the computer system, the failure may be corrected and the computer system state may be restored. Alternatively, a new computer system may replace the failing computer system, and the state may be restored to the new computer system. In either case, so called "bare metal" backup and restore products may begin the restore process with "bare metal" (that is, no software installed on the computer system yet, including operating system software). It may be desirable to install the operating system in an automated/unattended fashion in such circumstances since the restore may be initiated by an administrator/user who is not physically near the computer system to which the restore is being performed. Additionally, it may be desirable to perform the install in an automated/unattended fashion to simplify the restore process and reduce the opportunity for administrator/user error in the process. Other software products may also use automated operating system installs. For example, provisioning software products outfit a computer system with the software resources and configuration needed to perform one or more tasks. Provisioning software may make use of an automated operating system installation to provision a computer system with the desired operating system.

To properly perform an unattended operating system installation, the device drivers used by at least some of the hardware devices in the computer system on which the installation is to occur (the "target computer system") are required. Device drivers may be more briefly referred to herein as drivers. In some cases, the operating system installation media may include drivers for the hardware devices, but in other cases the drivers must be provided from another source.

Of particular concern are the drivers for any mass storage device (MSD) controllers in the computer system. The operating system is to be installed on the MSDs in the system, and thus the MSDs need to be accessible during the installation process. Accordingly, drivers for the MSD controllers are needed during the installation process.

For some operating systems, such as the Windows™ operating system family from Microsoft Corporation (Redmond, Wash.), a file is used to identify the drivers for installation during a text-mode portion of the installation, prior to starting the operating system itself. For example, Windows expects a file having the name "txtsetup.oem" to identify such drivers. Drivers may be identified using driver information files ("inf" files in Windows) for the graphical-mode portion of the installation (e.g. after the operating system has been started). Various MSD controller manufacturers identify drivers by listing them in either the txtsetup.oem file, in various inf files, or both. Some MSD controller manufacturers do not include a txtsetup.oem file on their installation media, or include a txtsetup.oem file that lists one or more inf files that include the desired drivers. Additionally, if drivers are gathered from another source than a manufacturer's installation medium, there may be no txtsetup.oem file. In some target computer systems, more than one MSD controller is included and the MSD controllers use different drivers. However, Windows expects a single txtsetup.oem file to identify the drivers for each MSD controller.

The VERITAS Bare Metal Restore™ (BMR) product available from VERITAS Software Corporation (Mountain View, Calif.) is one example of a backup/restore product which uses automated operating system installation. Accordingly, BMR creates a txtsetup.oem file for use in a given installation. If the target computer system has more the one MSD controller, information from more than one source may need to be merged into the txtsetup.oem file. Additionally, if no txtsetup.oem file exists, BMR creates one. In previous versions of BMR, the product attempted to process the txtsetup.oem file provided by an MSD manufacturer to identify installation drivers for the text phase. However, in some cases, there is no txtsetup.oem file to process or the txtsetup.oem file does not properly identify the driver. In other previous versions of BMR, the product attempted to process the driver information files instead of the txtsetup.oem file to identify installation drivers for the text phase. However, in some cases, an MSD uses a different driver for the text phase and for the graphical phase (when the inf files are used). The inf files do not specify the correct drivers in such cases.

Another issue encountered in identifying drivers for automated operating system installations occurs when gathering drivers from a running computer system (such as the computer system from which the backup is made). Some computer systems make use of virtual hardware devices. For example, virtual network interface cards (NICs) are often used for fault tolerance and/or load balancing purposes. When in use, a virtual NIC is mapped to a corresponding physical NIC (i.e. a NIC that is physically present in the computer system). Application software and even some operating system software uses the virtual NICs for network communications, and the virtual NICs may pass the communications to and from the physical NICs.

When virtual hardware devices are used, querying the running computer system to identified drivers is more complicated. The virtual hardware devices and physical hardware devices may both be indicated by the system (e.g. using various operating system application programming interfaces (APIs) and/or operating system files such as the Registry in Windows). However, the drivers for the devices may only be associated with the physical hardware devices. Drivers indicated for the virtual hardware devices, in some cases, cannot control the physical hardware devices. Accordingly, if a driver is selected from a virtual hardware device in the running computer system, the correct driver for the physical hardware device may not be identified. Additionally, in some cases, a virtual hardware device includes properties needed for installation and configuration. For example, transport control protocol/internet protocol (TCP/IP) properties may be including in the virtual NICs, in Windows systems.

SUMMARY OF THE INVENTION

In one embodiment, a computer accessible medium comprises a plurality of instructions which, when executed, parse at least a section of an input file to identify: (i) one or more driver information files, if at least one driver information file is listed in the section, and (ii) one or more first device drivers, if at least one device driver is listed in the section. The section corresponds to a hardware device. The plurality of instructions, when executed and if at least one driver information file is listed in the section, parse each of the one or more driver information files to identify: (i) one or more second device drivers, if at least one device driver is included in the driver information file, and (ii) one or more miniport drivers, if at least one miniport driver is included in the driver information file. The plurality of instructions, when executed, select a selected device driver from the first device drivers, the second device drivers, and the miniport drivers. The selected device driver is to be listed in an output file that is used in a text phase of an operating system installation on a computer system that includes the hardware device. A computer system including the computer accessible medium and a processor configured to execute the plurality of instructions is contemplated. A corresponding method is also contemplated.

In another embodiment, a computer accessible medium comprises a plurality of instructions which, when executed and if a computer system comprises at least one virtual hardware device, identify the virtual hardware device and a corresponding physical hardware device. The plurality of instructions also capture a device driver associated with the physical hardware device for use as the device driver in an install of an operating system on a second computer system having a same type of physical hardware device. A computer system including the computer accessible medium and a processor configured to execute the plurality of instructions is contemplated. A corresponding method is also contemplated.

BRIEF DESCRIPTION OF THE DRAWINGS

The following detailed description makes reference to the accompanying drawings, which are now briefly described.

Figure 1:
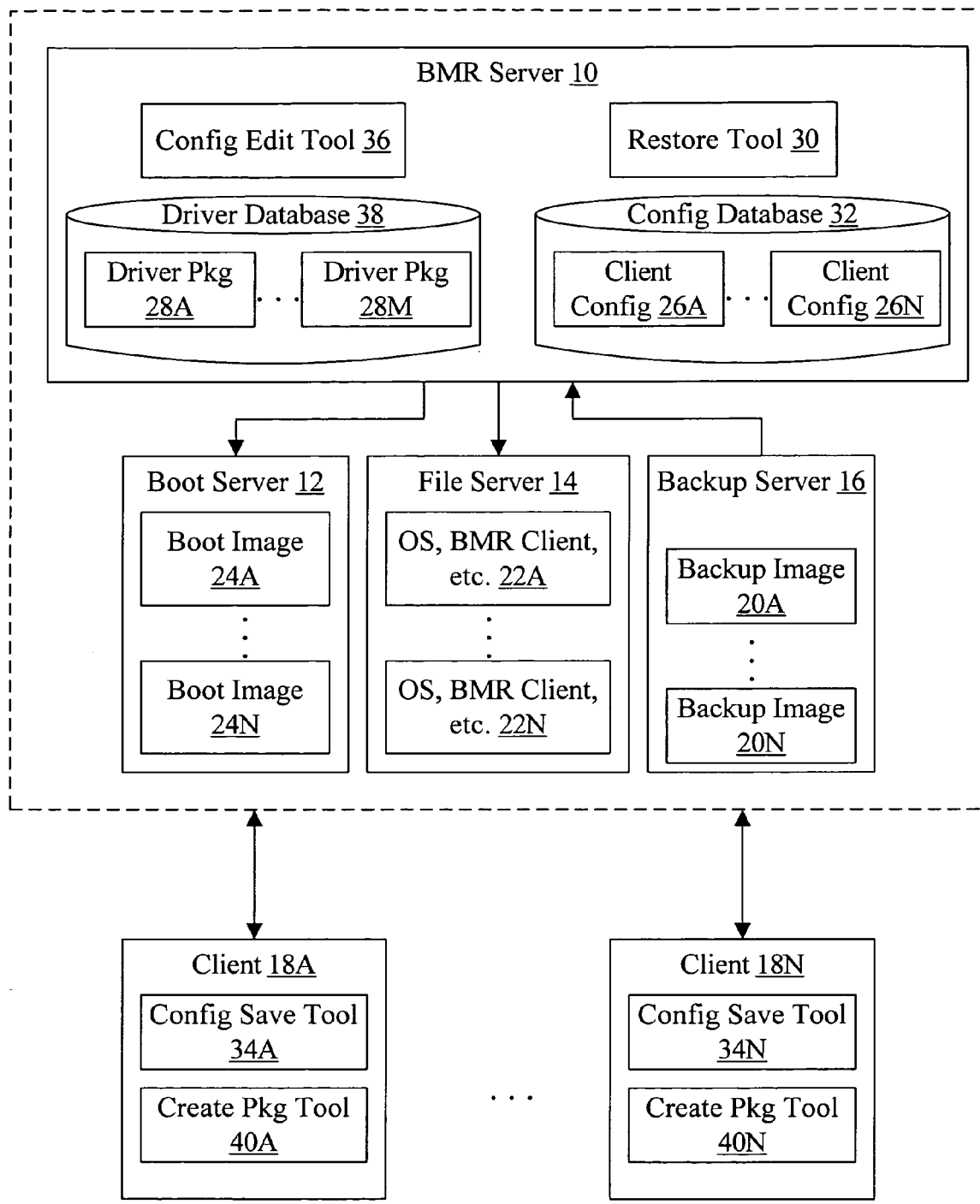
FIG. 1 is a block diagram of one embodiment of a set of servers and clients.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

FIG. 1 is an overview of a backup/restore system that may employ features described herein to identify a driver for a txtsetup.oem file and/or to identify drivers (and optionally other properties) for hardware devices for which the system includes virtual devices as well as physical devices. Other embodiments may use other backup/restore systems. Still further, other embodiments may perform automated operating system installs as part of other systems (e.g. provisioning systems).

Turning now to FIG. 1, a block diagram of one embodiment of a system comprising several servers and clients is shown. In the illustrated embodiment, a BMR server 10, a boot server 12, a file server 14, a backup server 16, and a set of clients 18A-18N are shown. Any number of clients 18A-18N may be included in various embodiments. The BMR server 10 is coupled to the boot server 12, the file server 14 and the backup server 16. The clients 18A-18N are generally configured to interact with the servers 10, 12, 14, and 16, and may be coupled to the servers 10, 12, 14, and 16. FIG. 1 is illustrative of logical relationships between the servers and clients. Physical connection may be established in any desired fashion (e.g. any type of network, combinations of networks, shared memory, etc.).

Each of the clients 18A-18N comprises a computer system that may be backed up and restored using the servers 10, 12, 14, and 16. Data corresponding to each client 18A-18N is backed-up in a respective backup image 20A-20N on the backup server 16. The backup images 20A-20N may be the most recent backup image of each client 18A-18N. Other, preceding backup images corresponding to various clients may also be retained on the backup server 16 or other storage. In some cases when a restore is to be performed, the data in a given backup image 20A-20N may have been backed up from the corresponding client 18A-18N previously, and may be restored due to a failure in the corresponding client 18A-18N (either hardware, software, or a combination thereof) or other loss of the data in the corresponding client 18A-18N. In some cases of a hardware failure in the corresponding client 18A-18N, the failing hardware may be replaced with different hardware. Alternatively, if a restore is to be performed, the data may have been backed up from another computer system (not shown) that subsequently experienced an irreparable failure or is otherwise being replaced by the corresponding client 18A-18N. The backup server 16 may implement any backup solution (e.g. the VERITAS NetBackup™ product from VERITAS Software Corporation, or any other VERITAS backup product or backup product from any other vendor).

At the time that a backup is performed from a client 18A-18N, a record is made of the system configuration of that client 18A-18N. The record is illustrated as the client configuration files 26A-26N in the configuration database 32 on the BMR server 10 in FIG. 1, although the record may be stored in any form. In some embodiments, the client configuration files 26A-26N may be part of the respective backup images 20A-20N as well, or the client configuration files 26A-26N may be stored only as part of the respective backup images 20A-20N and may be retrieved by the BMR server 10 when a client restore is to be performed. In one embodiment, each of the clients 18A-18N may have a config save tool 34A-34N installed to generate the corresponding client configuration files 26A-26N. The config save tool may comprise software (that is, a plurality of instructions) which, when executed, generates the client configuration file.

The client configuration files 26A-26N may store various information describing the corresponding client system 18A-18N configuration. For example, the system configuration may identify the device drivers (or more briefly, "drivers") used by the corresponding client system. As used herein, a "device driver" or "driver" may comprise any software that is used to control a hardware device included in a computer system and that may provide a higher level (more abstract) interface for other software to use in order to interact with the hardware device. Hardware devices controlled by device drivers may include MSD controllers such as small computer systems interface (SCSI) controllers, integrated device electronics (IDE) controllers, etc. Generally, an MSD controller may be any controller that is capable of interfacing to one or more mass storage devices such as disk drives, tape drives, compact disk (CD) drives, digital versatile disk (DVD) drives, etc. Hardware devices controlled by device drivers may further include NICs or on board circuitry that implements the same function as a NIC. Generally, NICs or corresponding on board circuitry, or any combination thereof, may be referred to as "network interface hardware". Still further, hardware devices controlled by device drivers may include video controllers/displays, audio controllers, peripheral bus controllers (also referred to as host bus adapters, or HBAs), and any other peripheral devices that may be included in or coupled to a computer system. The client configuration file 26A-26N may further include any other desired information (e.g. the number, type, and size of storage devices in the client system, the volumes on the storage devices, including the layout of volumes on the storage devices and the attributes of the volumes, the number and type of processors, the amount of memory, information on other peripheral devices, etc.).

The file server 14 may provide the clients 18A-18N with various software (reference numerals 22A-22N, respectively) used during the restore process, which may include the operating system software (e.g. operating system commands and libraries), BMR client software, backup client software, etc. The file server 14 may implement any file system usable over a network (e.g. network file system (NFS), Server Message Block (SMB) for Microsoft Windows™ or Samba for Unix-like implementations, etc.). The boot server 12 may be used to provide respective boot images 24A-24N to the clients 18A-18N. When a client 18A-18N is booted to perform a restore, the client 18A-18N may use standard network boot protocols to boot using the respective boot image 24A-24N. The boot images 24A-24N may include a customized restore procedure created by a restore tool 30 on the BMR server 10, to restore the client 18A-18N to the state corresponding to the respective backup image 20A-20N. In some embodiments, a media boot is supported in which the boot image 24A-24N and software 22A-22N are stored on a computer accessible medium such as a compact disc, and the disc is used to boot the client 18A-18N. In such embodiments, the boot server 12 and the file server 14 may be eliminated. In the present embodiment, a client 18A-18N at the beginning of the restore process to that client may be "bare metal". That is, no operating system software or other software may yet be installed (although firmware may be included in the client). A client 18A-18N that is being restored is referred to herein as the "target client".

Part of the restore procedure generated by the restore tool 30 includes performing an automated install of the operating system on the target client. If the Windows operating system is to be restored, a txtsetup.oem file is used to identify the drivers that are to be used during the text phase of the installation. In some embodiments, the txtsetup.oem file may be created by the restore tool 30. In other embodiments, the txtsetup.oem file may be created by the config save tools 34A-34N when a configuration save is made. In still other embodiments, the create package tools 40A-40N may create a txtsetup.oem file when creating a driver package 28A-28M. In various embodiments, the txtsetup.oem file may be created at any desired time. The txtsetup.oem file may be included in the files 22A-22N on the file server 14, in the boot image 24A-24N, or may be created and stored onto the target client, in various embodiments. Additional details regarding the creation of a txtsetup.oem file are provided below.

In some embodiments, a driver may be collected from a client system 18A-18N that is using at least one virtual hardware device corresponding to the physical hardware device that the driver controls. For example, the config save tool 34A-34N may be attempting to collect drivers for a configuration save into a client configuration file 26A-26N. Alternatively, the restore tool 30 may attempt to collect a driver from a running system that has the same type of hardware device (that would use the same driver) as the target client has for restoring to the target client. The config edit tool 36 may attempt to collect a driver to list in the client configuration file 26A-26N of the target client. Additional details regarding one embodiment of identifying a driver for a hardware device on a computer system that has at least one virtual hardware device are provided below.

If a backup image 20A-20N is to be restored to a target client that includes different hardware than the computer system from which the backup image 20A-20N was made (referred to more briefly as the "saved client"), the backup image 20A-20N may be modified to execute properly on the target client. For example, if the hardware differences between the saved client and the target client include one or more hardware devices on the target client that use different drivers than the hardware devices on the saved client, the drivers used on the target client are added to the backup image 20A-20N. In some cases, the differing hardware devices may replace hardware functionality of hardware devices that were included in the saved client. In other cases, the differing hardware devices may provide new hardware functionality not included in the saved client. Adding the drivers may involve inserting the driver file (or files) into an appropriate directory in the backup image 20A-20N, and may also include updating one or more operating system files that map drivers to devices (e.g. the registry in the Microsoft Windows™ operating system). The hardware differences between the saved client and the target client may also necessitate a different hardware abstraction layer (HAL) and/or different kernel. The HAL may generally provide a consistent, device independent interface for applications to use, abstracting out various hardware differences across hardware platforms. The kernel may be the central module of the operating system, providing various services to other parts of the operating system (e.g. memory management, disk management, process and task management, etc.). The HAL and kernel may be modified by changing the files containing the HAL and kernel code in the backup image 20A-20N.

In other embodiments, data files in the backup image 20A-20N may be modified. For example, various configuration files used by the operating system software within the backup image 20A-20N may be modified. Particularly, the media access controller (MAC) address of the NIC or NICs in various configuration files may be changed to match the target client.

In one embodiment, the restore tool 30 uses the client configuration file 26A-26N corresponding to the saved client to perform the restore. Particularly, the restore procedure may boot the client using drivers indicated in the client configuration file 26A-26N. In order to restore to different hardware in this embodiment, the client configuration file 26A-26N may be edited to change the driver information for the client, the HAL information for the client, and/or the kernel information for the client. The config edit tool 36 may be used to edit the client configuration file. Generally, the config edit tool 36 may comprise software that, when executed, permits a user to change the features of the client configuration file and either save the changed file as a new client configuration file or overwrite the original client configuration file.

In one embodiment, each of the BMR server 10, the boot server 12, the file server 14, and the backup server 16 may comprise computer systems configured to execute the corresponding server software. In some embodiments, one or more of the servers 10, 12, 14, and 16 may be combined onto the same physical computer system, as desired. Each computer system (including the client computer systems 18A-18N as well) may comprise at least one processor configured to execute the instructions comprising the software illustrated in FIG. 1, memory to store the instructions for execution by the processor, a computer accessible medium to store the instructions, etc.

The drivers provided when the target client has different hardware than the saved client may be drawn from different sources. For example, drivers may be published into a driver database 38 on the BMR server 10. The driver database 38 may comprise various driver packages 28A-28M, each containing driver files and various other driver configuration information (e.g. inf files used in the Microsoft Windows™ operating system). The clients 18A-18N may include a create package tool 40A-40N that may be used to publish drivers into the driver database 38. The user may select drivers from the driver database 38 when editing the client configuration file 26A-26N. Alternatively, drivers may be provided from other sources (e.g. another client configuration file, drivers shipped by the manufacturer of a device on a storage media, drivers downloaded from a network source such as the Internet, etc.).

In the illustrated embodiment, there is a boot image 24A-24N and a software image 22A-22N for each backup image 20A-20N (and for each client 18A-18N). In other embodiments, one boot image 24A-24N may be used for multiple backup images 20A-20N (and for multiple clients 18A-18N). Thus there may not be a one-to-one relationship between boot images 24A-24N and backup images 20A-20N (and clients 18A-18N). Similarly, in some embodiments, one software image 22A-22N may be used for multiple backup images 20A-20N (and for multiple clients 18A-18N). Thus there may not be a one-to-one relationship between software images 22A-22N and backup images 20A-20N (and clients 18A-18N).

Creating a txtsetup.oem File

One embodiment for creating a txtsetup.oem file for a target client is next described. The txtsetup.oem file is used in embodiments in which the Windows operating system is to be installed on the target client. Other embodiments may implement similar features for creating a file used by the operating system to locate the drivers during a text phase of the operating system installation.

Figure 2:
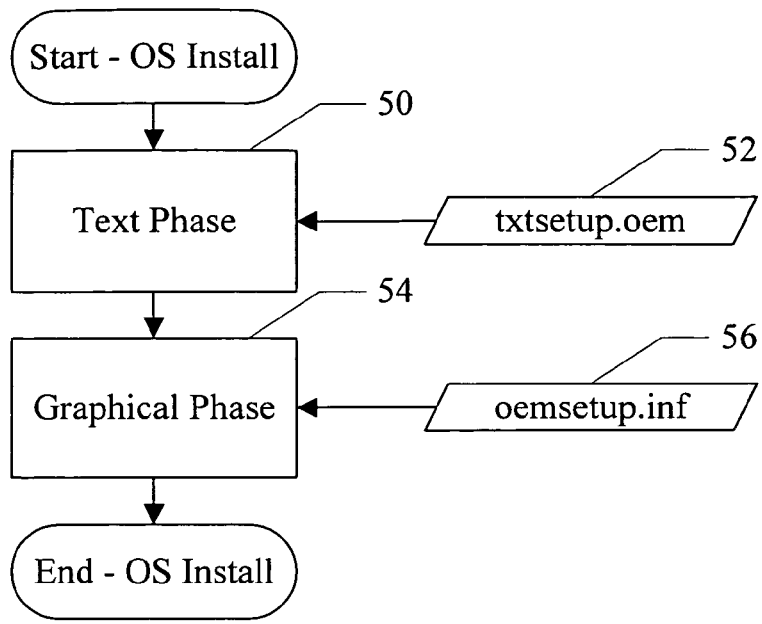
FIG. 2 is a flowchart illustrating one embodiment of installing an operating system.

Turning now to FIG. 2, a flowchart is shown illustrating one embodiment of the process of installing an operating system, where the process includes both a text phase and a graphical phase. Generally, the text phase includes copying at least a portion of the operating system onto the target client (e.g. onto the MSDs on the target client). The portion of the operating system copied during the text phase comprises at least enough of the core of the operating system to permit the operating system to be started. In some cases, the entirety of the operating system may be copied during the text phase. In other embodiments, the kernel of the operating system and related operating system modules used to start the operating system may be copied, and the remainder of the operating system modules may be copied during the graphical phase. The graphical phase may include the operating system discovering the hardware devices and configuration of the target client. For example, the Windows operating system may install information into the registry in the graphical phase. Among the information installed into the registry is the drivers to be used for the hardware devices in the target client. As mentioned previously, the drivers used in the operating system, installed during the graphical phase, may differ from the drivers used during the text phase in some cases.

During the text phase (block 50), the operating system installation uses the txtsetup.oem file to identify drivers for use on the hardware devices in the target client (reference numeral 52). Particularly, the txtsetup.oem file may identify a driver for the MSD controller in the target client, so that operating system files may be copied to the MSDs on the target client. If more than one MSD controller is included, more than one driver may be identified in the txtsetup.oem file in some embodiments.

During the graphical phase (block 54), drivers are identified for hardware devices using driver information files (e.g. oemsetup.inf in FIG. 2, reference numeral 56). In Windows operating system embodiments, driver information files may also be referred to as "inf" files, after the file extension of the files. Generally, a driver information file may identify drivers to be used for various hardware devices. While one txtsetup.oem file is expected during Windows operating system installs, many inf files may be provided if desired. In some embodiments, the driver information files may also provide additional information regarding the hardware devices.

In Windows operating system embodiments, both the txtsetup.oem file and the inf files may have multiple sections. Each section may correspond to a different hardware device and/or a different driver.

Figure 3:
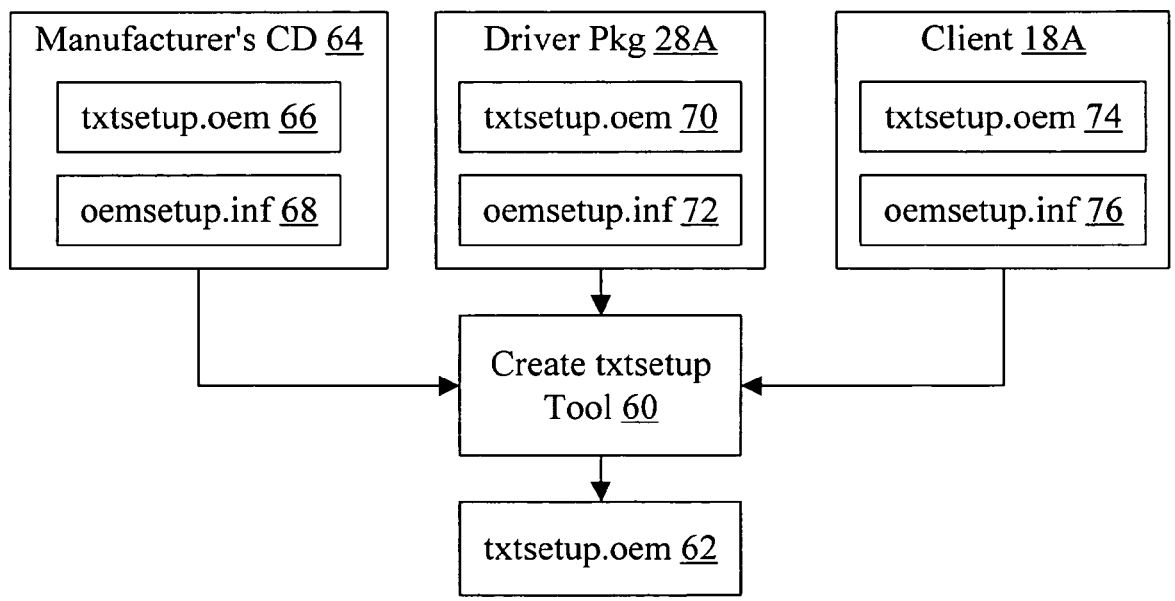
FIG. 3 is a block diagram of one embodiment of components used to create a txtsetup.oem file for an operating system installation.

Turning now to FIG. 3, a block diagram is shown illustrating one embodiment of some possible sources of txtsetup.oem files and oemsetup.inf files. Also shown in FIG. 3 is a create txtsetup tool 60, which may comprise software configured to generate an output txtsetup.oem file 62 for use in installing the Windows operating system on the target client. In different cases, one or more of the sources may be used to generate the txtsetup.oem file 62.

For example, one source may be a manufacturer's CD (or other computer accessible media) 64. The manufacturer's CD 64 may be shipped with the hardware device, and may include the drivers and other configuration files that are used with the hardware devices in a client. Particularly, as shown in FIG. 3, the manufacturer's CD 64 may include one or both of a txtsetup.oem file 66 and an oemsetup.inf 68. In other cases, the manufacturer's web site may be a source of drivers and corresponding txtsetup.oem and oemsetup.inf files.

Another source may be a driver package from the driver database 38 (e.g. the driver package 28A shown in FIG. 3). The driver package 28A may include one or both of a txtsetup.oem file 70 and an oemsetup.inf file 72. A third source illustrated in FIG. 3 may be a running client (e.g. client 18A). The client may include one or both of a txtsetup file 74 and an oemsetup.inf file 76.

In some embodiments, the user may identify which source or sources to use for locating input txtsetup.oem and/or oemsetup.inf files to be used to create the txtsetup.oem file 62. In other embodiments, the create txtsetup tool 60 may automatically search a set of sources for the correct files.

The create txtsetup tool 60 may be included in various other software shown in FIG. 1, in various embodiments. For example, as mentioned above with regard to FIG. 1, various embodiments may create a txtsetup.oem file 62 as part of the restore tool 30, the config save tools 34A-34N, or the create package tools 40A-40N. In such embodiments, the create txtsetup tool 60 may be part of any of the above software.

Figure 4:
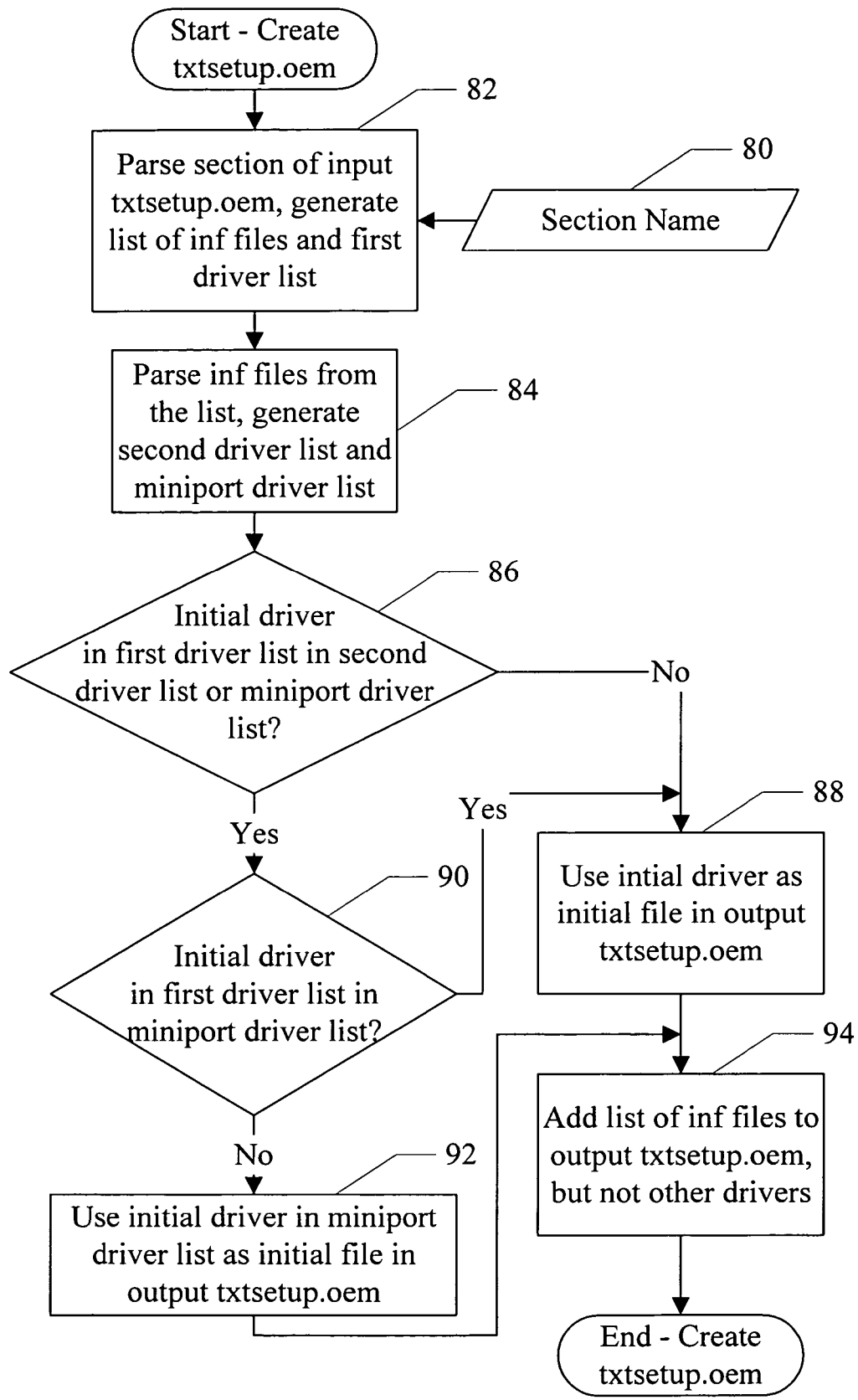
FIG. 4 is a flowchart illustrating operation of one embodiment of software to create the txtsetup.oem file.

The create txtsetup tool 60 may search both input txtsetup files (e.g. reference numerals 66, 70, and 74) and oemsetup.inf files (e.g. reference numerals 68, 72, and 76) to locate the correct drivers for listing in the output txtsetup.oem file 62. For example, FIG. 4 is a flowchart illustrating one embodiment of the create txtsetup tool 60. That is, the create txtsetup tool 60 may comprise a plurality of instructions which, when executed, implement the operation shown in FIG. 4.

The create txtsetup tool 60 may receive, as input, a section name for a section to parse in an input txtsetup.oem file (reference numeral 80). In the case that a driver has been captured from a client, the input txtsetup.oem file may contain only one section. In other cases (e.g. from the manufacturer's CD 64), the txtsetup.oem file may have several sections. The user may be requested to select the section that is to be processed. Alternatively, each section may be processed, in some implementations. The input txtsetup.oem file may be obtained from any source (e.g. any of the sources shown in FIG. 3).

Each section of the txtsetup.oem file may list zero or more drivers and zero or more inf files, although at least one driver or inf file may generally be listed. For example, the driver files and inf files may be listed by filename and file extension. In some embodiments, a path name may also be supplied if needed. Similarly, inf files may have sections listing one or more drivers.

The create txtsetup tool 60 parses the section of the input txtsetup.oem file to identify any drivers indicated in the section and to identify any inf files in the section. The create txtsetup tool 60 may create a first driver list and a list of inf files, respectively, as a result of parsing the section of the txtsetup.oem file (block 82). That is, the first driver list may be the list of driver file names (and extensions, if applicable) parsed from the section of the input txtsetup.oem file. The list of inf files may be the list of inf file names (and the extension inf, if applicable) parsed from the section of the input txtsetup.oem file.

The create txtsetup tool 60 may parse each inf file in the list of inf files parsed from the input txtsetup.oem file (block 84). Drivers listed in the inf files may be added to a second driver list. Additionally, drivers indicated as miniport drivers may be added to a miniport driver list. As used herein, a miniport driver may be the "main" device driver for a hardware device. Other device drivers may be identified for the device as well. For example, a "driver stack" may be used in which the miniport driver is surrounded by one or more filter drivers. Filter drivers may include upper drivers which reside between the miniport driver and the applications, and lower drivers which reside between the miniport driver and the hardware device. Additionally, "helper" drivers may be defined to perform specific functions. In the case of an MSD controller, the miniport driver may be a SCSI miniport driver.

The first driver list may have the drivers listed in the order that the drivers were found in the section of the input txtsetup.oem file. The initial driver identified in a section of the txtsetup.oem file is supposed to be the miniport driver for the hardware device, but not all manufacturers follow this rule. In some cases, the second driver list and the miniport driver list may also have the drivers listed in the order that they were found in the inf files.

The create txtsetup tool 60 selects a driver to be listed in the output txtsetup.oem file 62 from the drivers listed in the first driver list, the second driver list, and the miniport driver list. To make the selection, the create txtsetup tool 60 selects the initial driver from the first driver list (that is, the driver that was listed in the input txtsetup.oem file before any other driver, if any) and compares the driver to the drivers listed in the second driver list and the miniport driver list. That is, the create txtsetup tool 60 may compare the filenames and extensions of the drivers.

If the initial driver from the first driver list is not listed in either the second driver list or the miniport driver list (decision block 86, "no" leg), the create txtsetup tool 60 uses the initial driver as the initial file listed in the output txtsetup file 62 (block 88). This case may occur, for example, if the hardware device uses one driver during the text phase 50, and another driver during the graphical phase 54.

If the initial driver is listed in at least one of the second driver list or the miniport driver list (decision block 86, "yes" leg), the initial driver is still selected as the initial file listed in the output txtsetup file 62 if the initial driver is listed in the miniport driver list (decision block 90, "yes" leg). In this case, the initial driver from the input txtsetup.oem file has been verified to be a miniport driver, and thus may be suitable for use during the text phase. If the initial driver is not listed in the miniport driver list (decision block 90, "no" leg), the create txtsetup tool 60 selects the initial file from the miniport driver list as the initial file for the output txtsetup.oem file 62 (block 92).

In addition to listing the driver as selected above, the create txtsetup tool 60 may add to the output txtsetup.oem file 62 the list of inf files specified in the input txtsetup.oem file (block 94). However, other drivers may not be listed in the output txtsetup.oem file 62. These other drivers are excluded from the output txtsetup.oem file 62 because the inventors have observed that having additional drivers in the output txtsetup.oem file 62 has created problems for the automated installation. That is, the automated installation did not work in some cases. However, the other drivers may be included in the driver package with the selected driver, so that the other drivers are available on the target client (e.g. for Plug 'n Play installations of the drivers).

Figure 5:
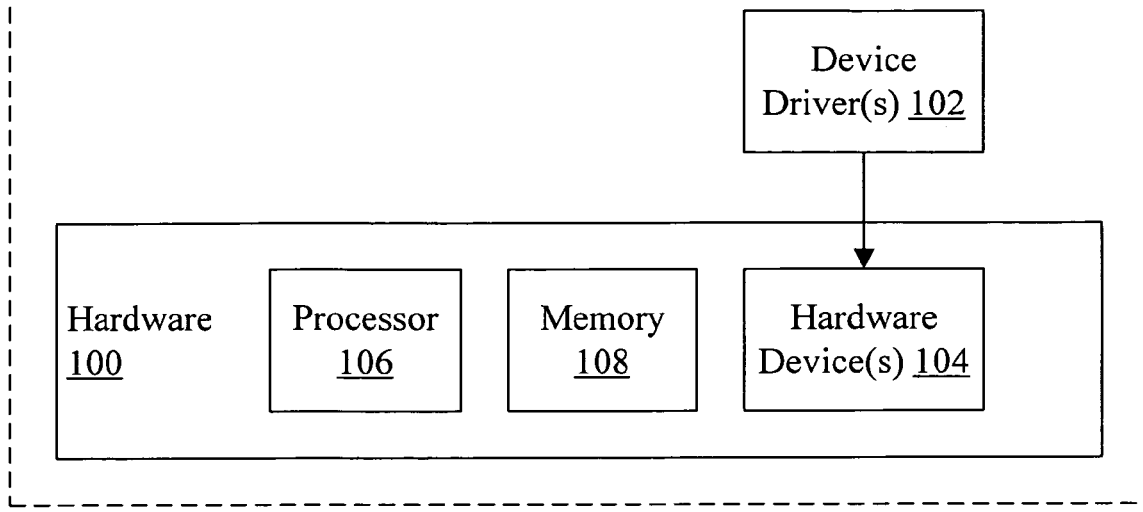
FIG. 5 is a block diagram of one embodiment of a computer system including hardware devices and corresponding device drivers.

FIG. 5 is a block diagram illustrating one embodiment of a client 18A having hardware 100 and one or more device drivers 102, illustrating the relationship of device drivers to hardware devices 104 in the hardware 100. As mentioned above with respect to FIG. 1, a variety of hardware devices may be controlled by device drivers. The hardware 100 may also include other hardware (e.g. a processor 106 configured to execute instructions, including the instructions forming the device drivers 102, a memory 108 configured to store the instructions for execution, data for access by the processor 106, etc.).

Identifying Drivers when Virtual Hardware Devices are Used

Figure 6:
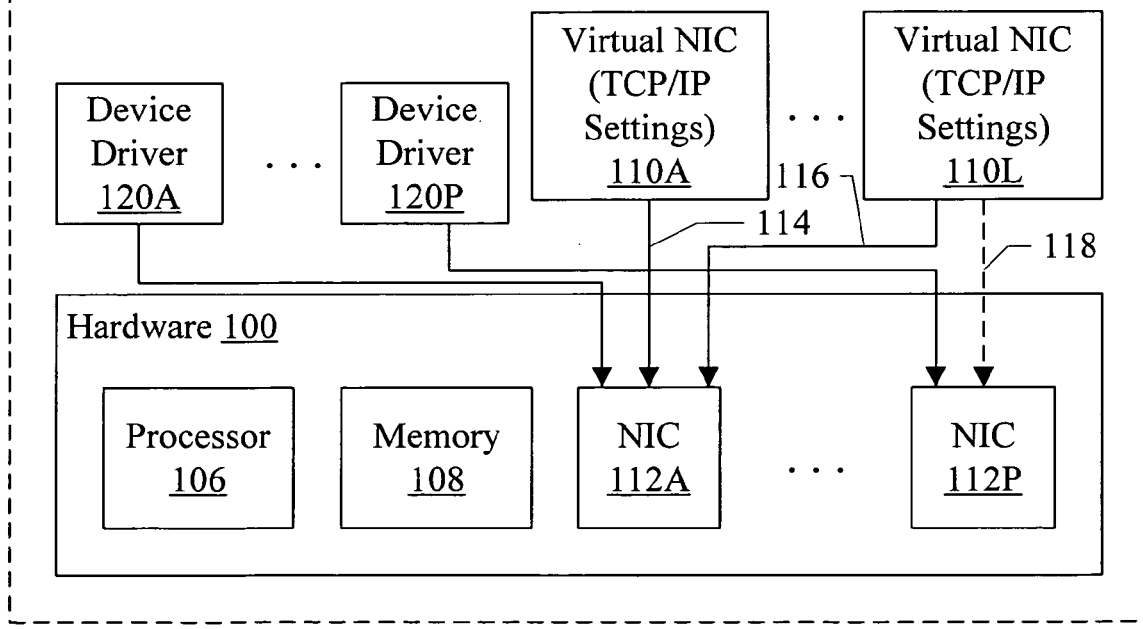
FIG. 6 is a block diagram of one embodiment of a computer system including virtual network interface cards (NICs) and corresponding physical NICs having device drivers.

FIG. 6 is a block diagram illustrating another embodiment of a client 18A including virtual hardware devices (e.g. virtual NICs, in this embodiment).

In the embodiment of FIG. 6, one or more virtual NICs 110A-110L and one or more physical NICs 112A-112P may be included. Any number of virtual NICs 110A-110L and any number of physical NICs 112A-112P may be included. The number of virtual NICs 110A-110L may be greater than, equal to, or less than the number of physical NICs 112A-112P.

The virtual NICs 110A-110L may be mapped to the physical NICs 112A-112P in any desired fashion. For example, virtual NICs may share a physical NIC (e.g. lines 114 and 116 in FIG. 6). Alternatively, virtual NICs may be mapped to different physical NICs (e.g. lines 114 and 118 in FIG. 6).

A device driver 120A-120P may be included for each physical NIC 112A-112P. Separate physical NICs 112A-112P may use the same device driver 120A-120P in some embodiments, so there may be fewer device drivers than there are physical NICs 112A-112P. The device drivers 120A-120P are associated with the physical NICs 112A-112P (illustrated by the arrows from the device drivers 120A-120P to the physical NICs 112A-112P in FIG. 6), but may not have any direct connection to the virtual NICs 112A-112P. On the other hand, other properties of the NICs may be included in the virtual NICs 110A-110L (e.g. TCP/IP settings in FIG. 6). Such properties may also be used in restoring to a target client, and thus may be captured along with identifying the drivers.

Also shown in the embodiment of FIG. 6 is the hardware 100, including a processor 106 and memory 108, similar to the embodiment of FIG. 5 described above. While virtual NICs are used as an example in FIG. 6, and in the detailed examples of FIGS. 8 and 9, any virtual hardware devices may be used in other embodiments. As used herein, a virtual hardware device may comprise a software-created construct that is used by application programs and/or operating system modules as if it were the hardware device. The virtual hardware device may comprise any combination of data structures and/or software. Each virtual hardware device that is in use is mapped to a physical hardware device. The physical hardware device is the hardware device that is physically present in the computer system. The physical hardware device provides the hardware function for the virtual hardware device.

Figure 7:
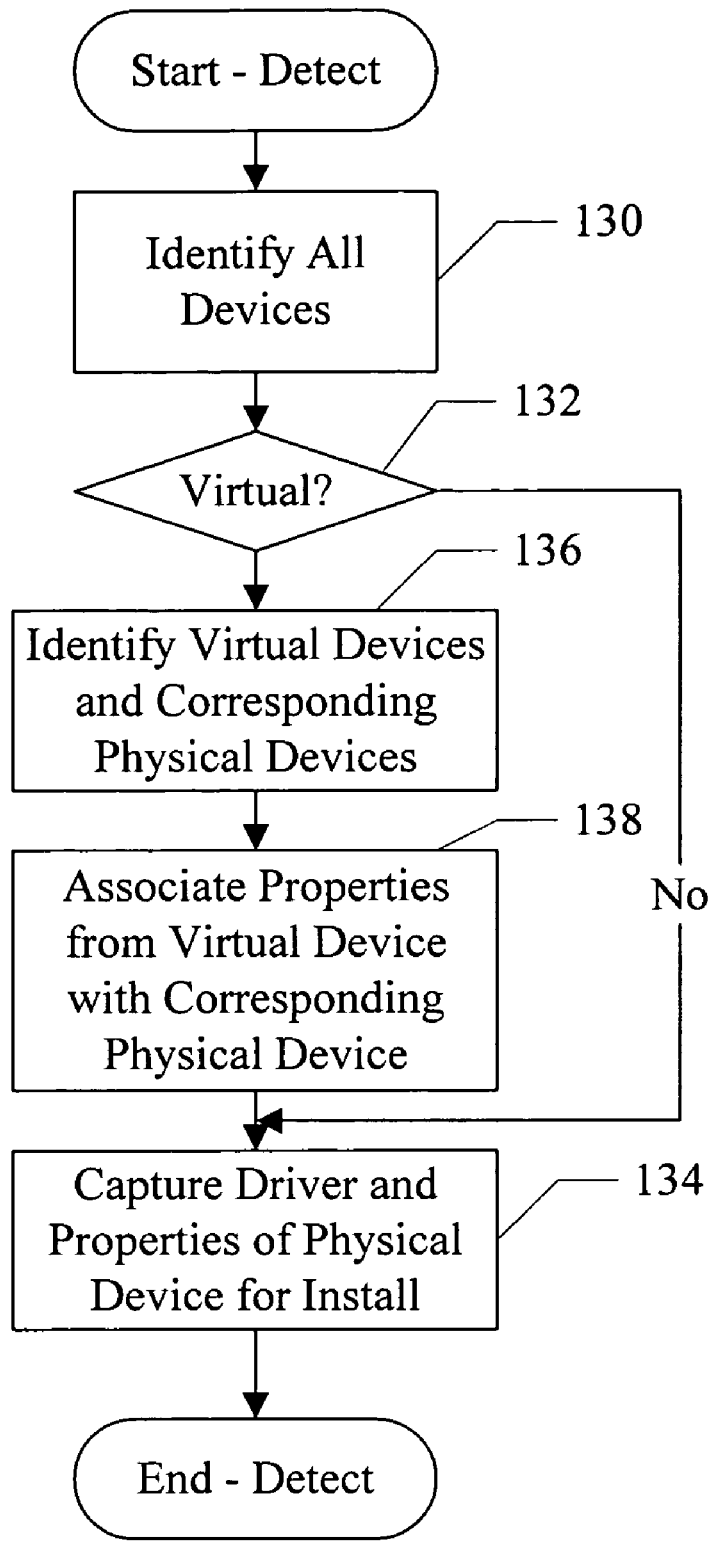
FIG. 7 a flowchart illustrating detection of devices in a computer system that includes virtual devices.

FIG. 7 is a flowchart illustrating operation of one embodiment of software that may be used to identify the device drivers (e.g. device drivers 120A-120P) that may be used for physical hardware devices when corresponding virtual hardware devices are also in use. For example, the software may be executed on the client 18A shown in FIG. 6 (e.g. by the processor 106). Generally, the software may comprise instructions which, when executed, implement the operation shown in FIG. 7.

The software may identify all devices of the type for which corresponding device drivers are to be identified (block 130). That is, both the virtual hardware devices and the physical hardware devices are in the list of identified devices. Various mechanisms may be used to identify the devices. For example, some operating systems may provide an API for requesting information on the devices in the system. In other cases, operating system databases/configuration files may be consulted (e.g. the Windows operating system's Registry). In still other cases, a combination of APIs and databases/configuration files may be used.

The software may determine if there are virtual hardware devices (decision block 132). A variety of mechanisms may be used to determine if there are virtual hardware devices. For example, if the hardware devices are Plug 'n Play devices, the Plug 'n Play identifiers (PnP IDs) may be used to detect virtual hardware devices. The PnP IDs identify the manufacturer, model number, etc. of the hardware devices, but there are also PnP IDs for legacy devices. The legacy PnP IDs do not identify a specific manufacturer, etc. Since Virtual hardware devices are not real hardware devices, they may use the legacy PnP IDs. Another mechanism may be used for NICs. NICs have a MAC address, and the MAC addresses may be compared to detect a duplicate or duplicates. If a duplicate is detected, one of the devices having the duplicate is virtual and the other is physical. More than one duplicate of a given MAC address may be detected if more than one virtual NIC is mapped to the same physical NIC. Other hardware devices may similarly have an address that may be duplicated between a virtual hardware device and the corresponding physical hardware device. Any unique value duplicated between the virtual hardware device and the corresponding physical hardware device may be used to detect duplication and thus to detect virtual hardware devices.

If there are no virtual hardware devices (decision block 132, "no" leg), the software may capture the driver for the physical hardware device or devices (block 134). Also, the software may capture any other properties of the device that may be used for the install, if any (e.g. the TCP/IP settings of a NIC).

If there are virtual hardware devices (decision block 132, "yes" leg), the software may identify the virtual devices and the corresponding physical devices (block 136). Optionally, the software may associate the properties from the virtual device with the physical device, if one or more properties are found in the virtual device instead of the physical device (block 138). For example, for virtual NICs, the TCP/IP settings are found in the virtual NICs rather than the physical NICs, in some embodiments. The software may then capture the driver (and optionally other properties) of the physical device or devices (block 134).

Figure 8:
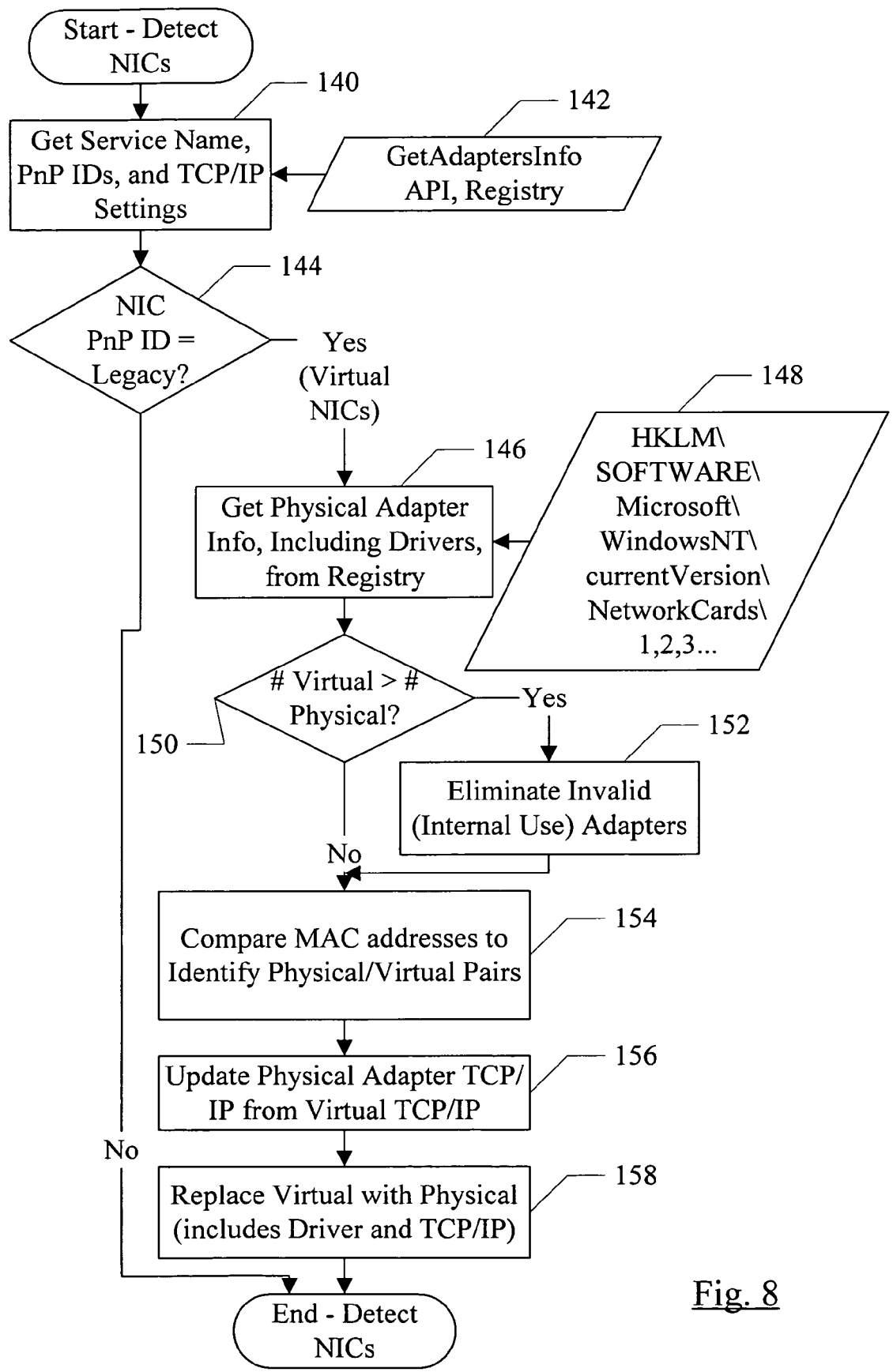
FIG. 8 is a flowchart illustrating one embodiment of detecting virtual and physical NICs in greater detail.
Figure 9:
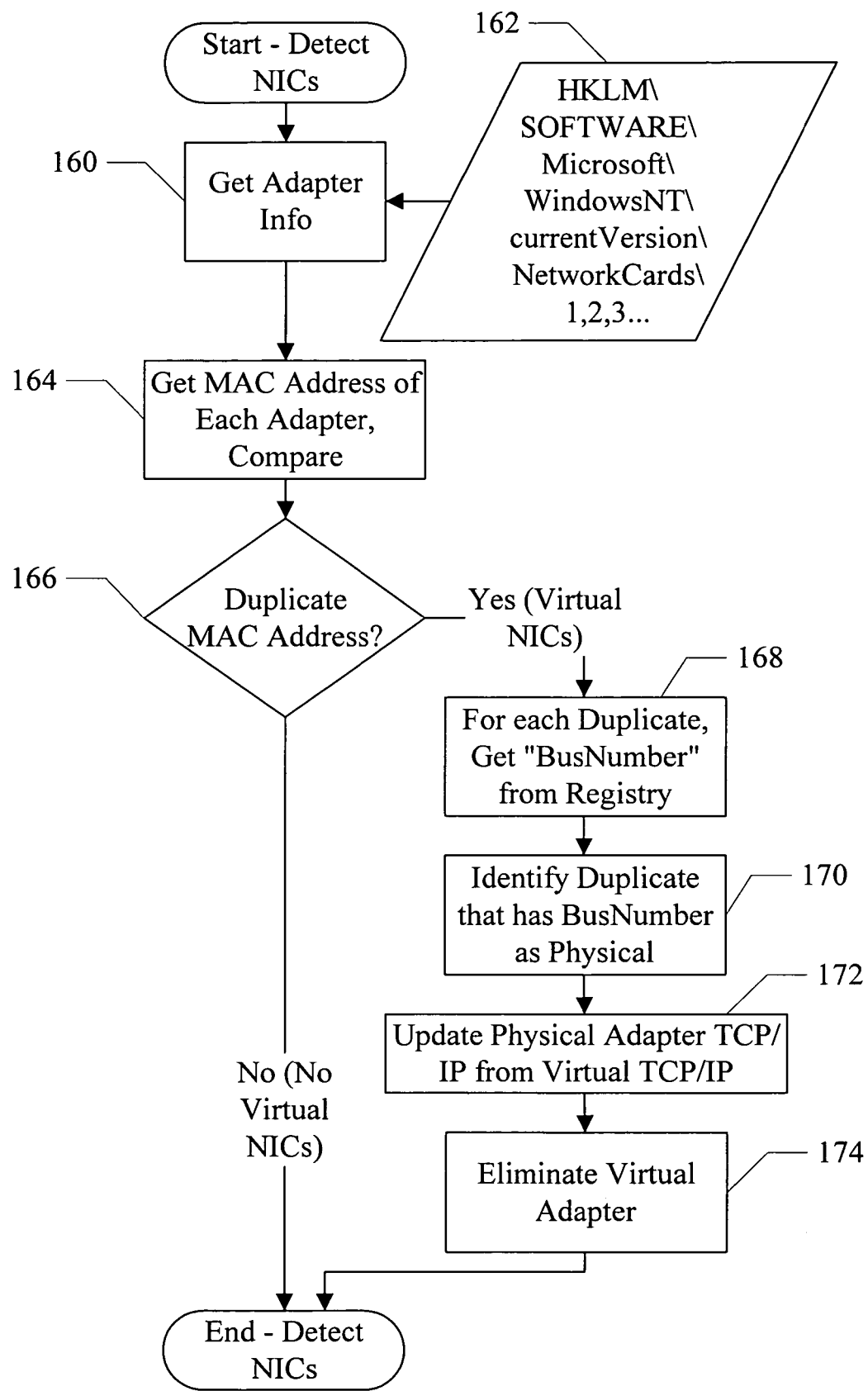
FIG. 9 is a flowchart illustrating another embodiment of detecting virtual and physical NICs in greater detail.

FIGS. 8 and 9 are more detailed examples of a portion of the software illustrated in FIG. 7 that detects the virtual NICs, identifies them, and optionally captures any properties from the virtual NICs into the physical NICs (blocks 130, 132, 136, and 138), for embodiments used with the Windows operating system and for handling virtual NICs. Each of FIGS. 8 and 9 may exit to block 134 in FIG. 7. More particularly, the embodiment of FIG. 8 may be used for the Windows2000™ operating system (and later versions, such as Windows XP™ or Windows 2003™). The embodiment of FIG. 9 may be used for the WindowsNT™ operating system. Other operating systems may use other mechanisms. The software in each embodiment (of FIG. 8 and FIG. 9) may comprise a plurality of instructions which, when executed, perform the operation shown in the respective flowchart.

Beginning with the embodiment of FIG. 8, the software may obtain the service name, the PnP IDs, and the TCP/IP settings for each NIC (block 140). As illustrated at reference numeral 142, the software may use the GetAdaptersInfo API in Windows2000 as well as the Registry to gather the information. In this embodiment, if virtual NICs are included, only information related to the virtual NICs is returned in the GetAdaptersInfo API. If virtual NICs are not used, then physical NIC information is returned.

The software may analyze the PnP IDs to determine if any of them are legacy PnP IDs. For example, in the present embodiment, legacy PnP IDs may all start with Root\\. If none of the NICs are indicated as legacy (decision block 144, "no" leg), then there are no virtual NICs and the flowchart of FIG. 8 may exit to block 134 in FIG. 7. The information obtained from the GetAdaptersInfo and the Registry includes the correct drivers as well as TCP/IP properties in this case.

On the other hand, if at least one NIC is virtual (decision block 144, "yes" leg), the software may obtain the physical adapter information, including the drivers used for each NIC, from the Registry (block 146). The key in the Registry that provides this information is shown at reference numeral 148. If the number of virtual NIC adapters identified in block 140 is greater than the number of physical NIC adapters identified from the Registry (decision block 150, "yes" leg), then at least some NICs have invalid (internal use) IP addresses (e.g. IP addresses of 0.0.0.0 or autoconfigured IP addresses such as 169.256.xxx.xxx). The invalid adapters are eliminated (block 152). With the remaining NIC adapters after the elimination represented by block 152 (or all NIC adapters if the number of virtual adapters is the same as the number of physical adapters—decision block 150, "no" leg), the software compares the MAC addresses to identify virtual/physical NIC pairs (block 154). That is, the virtual NIC and its corresponding physical NIC have the same MAC address. The software updates the TCP/IP settings in the physical adapter information from the TCP/IP settings in the virtual adapter information (block 156). In this fashion, the driver for the NIC and the TCP/IP settings for the NIC are found in the physical adapter's information. The virtual adapter is replaced with the physical adapter (block 158), and the flowchart exits to block 134 to capture the driver and properties of the physical device.

FIG. 9 begins with the software obtaining the adapter info for each NIC adapter from the Registry (block 160, using the key illustrated at reference numeral 162). Both physical and virtual adapters are identified in the Registry in WindowsNT. The software obtains the MAC address of each NIC adapter (block 164) and compares the MAC addresses. If no duplicate MAC addresses are detected (decision block 166, "no" leg), then no virtual NICs are included and the physical NIC information from the Registry correctly identifies the drivers for the NICs and the TCP/IP settings for the NICs.

On the other hand, if at least one virtual NIC is detected via a duplicate MAC address (decision block 166, "yes" leg), the software may, for each adapter that has a duplicated MAC address, obtain the BusNumber from the Registry entry for that adapter (block 168). Physical NIC adapters have a BusNumber in their Registry entries, while virtual NIC adapters do not. Thus, the software identifies the adapter having a duplicate MAC address and no BusNumber as the virtual NIC, and identifies the adapter having that MAC address and having a BusNumber as the corresponding physical NIC (block 170). The software updates the TCP/IP settings of the physical NIC adapter with the settings from the virtual NIC adapter (block 172) and eliminates the virtual NIC adapter 174. The flowchart then exits to block 134 (FIG. 7) capture the driver and properties of the physical device.

As mentioned above with regard to FIG. 1, other embodiments may implement the network interface functionality on board, rather than as a card. Thus, while a NIC was used as an example in FIGS. 6-9, other embodiments may use any type of network interface hardware as an example.

Figure 10:
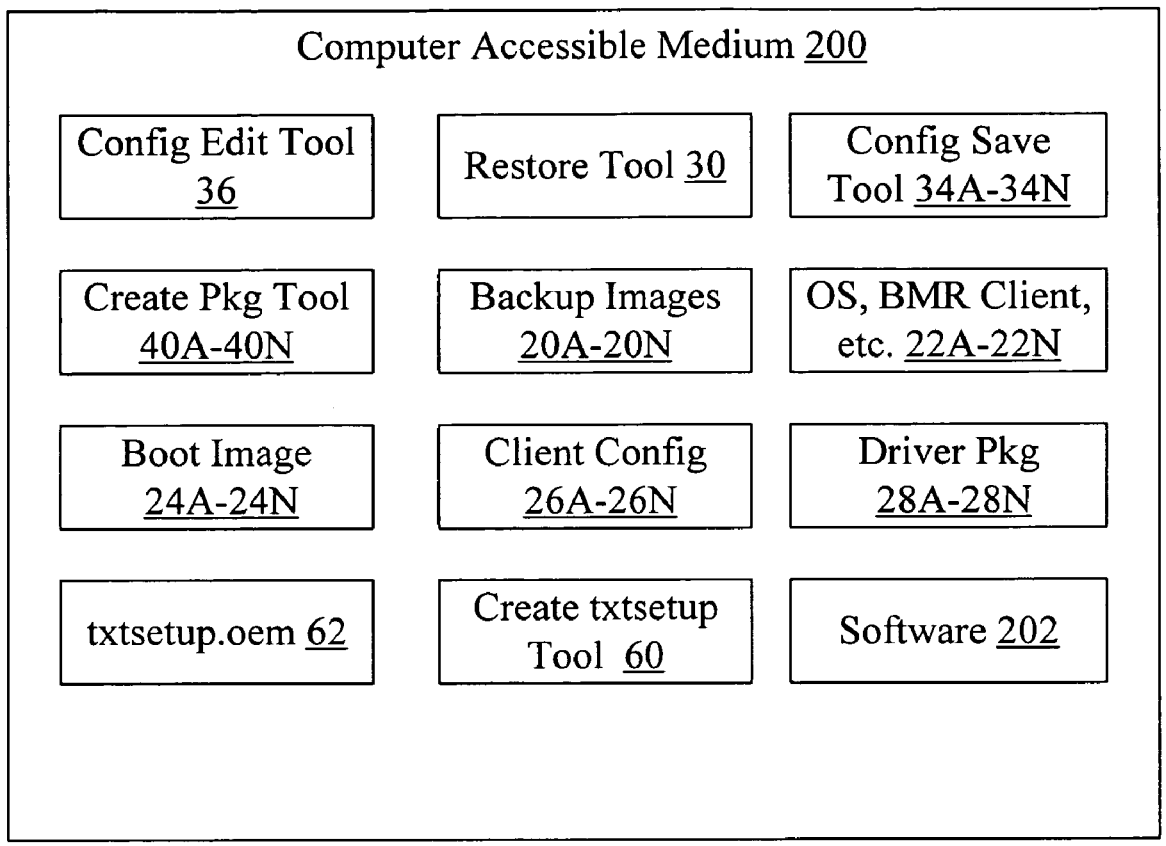
FIG. 10 is a block diagram of one embodiment of a computer accessible medium.

Turning now to FIG. 10, a block diagram of a computer accessible medium 200 is shown. Generally speaking, a computer accessible medium may include any media accessible by a computer during use to provide instructions and/or data to the computer. For example, a computer accessible medium may include storage media such as magnetic or optical media, e.g., disk (fixed or removable), CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link. The computer accessible medium 200 in FIG. 10 may be encoded with one or more of the restore tool 30, the config edit tool 36, one or more config save tools 34A-34N, one or more client configuration files 26A-26N, one or more backup images 20A-20N, one or more create package tools 40A-40N, one or more driver packages 28A-28M, the output txtsetup.oem file 62, the create txtsetup tool 60, and/or other software 202 (e.g. the software illustrated in one or more of FIGS. 7-9). The restore tool 30, the config edit tool 36, the config save tools 34A-34N, the create package tools 40A-40N, the create txtsetup tool 60, and the software 202 may each comprise instructions which, when executed, implement the operation described herein for the software. Generally, the computer accessible medium 200 may store any set of instructions which, when executed, implement a portion or all of the flowcharts shown in one or more of FIGS. 2, 4, and 7-9. In some embodiments, a computer accessible medium similar to the computer accessible medium 200 may be included in a client 18A-18N, the BMR server 10, the boot server 12, the file server 14, and/or the backup server 16.

Numerous variations and modifications will become apparent to those skilled in the art once the above disclosure is fully appreciated. It is intended that the following claims be interpreted to embrace all such variations and modifications.

What is claimed is:

1. A computer accessible medium comprising a plurality of instructions which, when executed:
   parse at least a section of an input file to identify: (i) one or more driver information files, if at least one driver information file is listed in the section, and (ii) one or more first device drivers, if at least one device driver is listed in the section, wherein the section corresponds to a hardware device;
   if at least one driver information file is listed in the section, parse each of the one or more driver information files to identify: (i) one or more second device drivers, if at least one device driver is included in the driver information file, and (ii) one or more miniport drivers, if at least one miniport driver is included in the driver information file;
   select a selected device driver from the first device drivers, the second device drivers, and the miniport drivers, the selected device driver to be listed in an output file that is used in a text phase of an operating system installation on a computer system that includes the hardware device, and wherein the selected device driver is an initial device driver of the first device drivers if the initial device driver is not included in either the second device drivers or the miniport drivers; and store the output file that is used in the text phase of the operating system installation on the computer system, including listing the selected device driver in the output file.

2. The computer accessible medium as recited in claim 1 wherein the selected device driver is the initial device driver if the initial device driver is included in the miniport drivers.

3. The computer accessible medium as recited in claim 2 wherein, if the selected device driver is not the initial device driver, the selected device driver is an initial miniport driver of the miniport drivers.

4. The computer accessible medium as recited in claim 1 wherein the plurality of instructions, when executed, include a list of the driver information files, if any, in the output file.

5. The computer accessible medium as recited in claim 4 wherein the plurality of instructions, when executed, exclude other ones of the first device drivers, the second device drivers, and the miniport drivers except for the selected device driver from the output file.

6. A computer system comprising hardware to execute the plurality of instructions and the computer accessible medium as recited in claim 1 coupled to the hardware to supply the plurality of instructions for execution.

7. A method comprising:

parsing at least a section of an input file to identify: (i) one or more driver information files, if at least one driver information file is listed in the section, and (ii) one or more first device drivers, if at least one device driver is listed in the section, wherein the section corresponds to a hardware device;

if at least one driver information file is listed in the section, parsing each of the one or more driver information files to identify: (i) one or more second device drivers, if at least one device driver is included in the driver information file, and (ii) one or more miniport drivers, if at least one miniport driver is included in the driver information file;

selecting a selected device driver from the first device drivers, the second device drivers, and the miniport drivers, the selected device driver to be listed in an output file that is used in a text phase of an operating system installation on a computer system that includes the hardware device, and wherein the selected device driver is an initial device driver of the first device drivers if the initial device driver is not included in either the second device drivers or the miniport drivers; and storing the output file that is used in the text phase of the operating system installation on the computer system, the storing including listing the selected device driver in the output file.

8. The method as recited in claim 7 wherein the selected device driver is the initial device driver if the initial device driver is included in the miniport drivers.

9. The method as recited in claim 8 wherein, if the selected device driver is not the initial device driver, the selected device driver is an initial miniport driver of the miniport drivers.

10. The method as recited in claim 7 further comprising including a list of the driver information files, if any, in the output file.

11. The method as recited in claim 10 further comprising excluding other ones of the first device drivers, the second device drivers, and the miniport drivers except for the selected device driver from the output file.

* * * * *